(12) United States Patent
Seminel (10) Patent No.: US 11,280,700 B2
(45) Date of Patent: Mar. 22, 2022

(54) BLADE STRUCTURE HEALTH MONITORING SYSTEM

(71) Applicant: Ratier-Figeac SAS, Figeac (FR)

(72) Inventor: Bruno Seminel, Lissac-et-Mouret (FR)

(73) Assignee: RATIER-FIGEAC SAS, Figeac (FR)

( * ) Notice: Subject to any disclaimer, the term of this patent is extended or adjusted under 35 U.S.C. 154(b) by 355 days.

(21) Appl. No.: 15/443,264

(22) Filed: Feb. 27, 2017

(65) Prior Publication Data
US 2017/0315020 A1  Nov. 2, 2017

(30) Foreign Application Priority Data
Apr. 29, 2016 (EP) ................................. 16305499

(51) Int. Cl.
| | |
|---|---|
| *G01M 15/14* | (2006.01) |
| *B64C 11/20* | (2006.01) |
| *B64D 25/00* | (2006.01) |
| *B64C 11/00* | (2006.01) |
| *G01H 1/00* | (2006.01) |
| *G01M 7/02* | (2006.01) |

(52) U.S. Cl.
CPC ............. *G01M 15/14* (2013.01); *B64C 11/00* (2013.01); *B64C 11/20* (2013.01); *B64D 25/00* (2013.01); *G01H 1/003* (2013.01); *G01M 7/025* (2013.01)

(58) Field of Classification Search
CPC ...... G01N 29/12; G01N 29/036; G01N 29/46; G01N 2291/014; G01N 29/348; G01M 15/14; G01M 7/025; B64C 11/00; B64C 11/20; B64D 25/00; G01H 1/003

USPC .................................. 73/579, 660, 659, 583
See application file for complete search history.

(56) References Cited

U.S. PATENT DOCUMENTS

| | | | | |
|---|---|---|---|---|
| 5,152,172 | A  * | 10/1992 | Leon ...................... | G01H 1/006 310/40 R |
| 6,094,989 | A  * | 8/2000 | Twerdochlib .......... | G01N 29/07 702/56 |
| 6,415,206 | B1 * | 7/2002 | Ventres ................. | B64C 27/001 244/17.11 |
| 9,459,179 | B2 * | 10/2016 | Brenner ................. | G01H 1/003 |
| 10,371,123 | B2 * | 8/2019 | Kammer ................. | F03D 17/00 |
| 2006/0080010 | A1 | 4/2006 | Gaiani | |
| 2010/0175480 | A1 * | 7/2010 | Guy .................... | G01M 5/0016 73/660 |

(Continued)

FOREIGN PATENT DOCUMENTS

| | | | | |
|---|---|---|---|---|
| CA | 2651925 | A1 * | 11/2007 | .......... G01M 5/0066 |
| EP | 1509775 | A1 | 3/2005 | |

(Continued)

OTHER PUBLICATIONS

European Search Report for International Application No. 16305499.2, dated Sep. 12, 2016, 9 pages.

*Primary Examiner* — Nimeshkumar D Patel
*Assistant Examiner* — Nashmiya S Fayyaz
(74) *Attorney, Agent, or Firm* — Cantor Colburn LLP (57) ABSTRACT

A rotating system comprising two or more blades 3 mounted on a hub installed on a rotatable propeller shaft 1, each blade provided with a respective sensor 4 arranged to detect response of the respective blade to harmonic excitation; and the system further comprising means configured to compare the response of the respective blade to that of the other blade(s).

3 Claims, 9 Drawing Sheets

(56) References Cited

U.S. PATENT DOCUMENTS

| | | | |
|---|---|---|---|
| 2011/0041617 A1* | 2/2011 | Cotrell | G01M 7/025 |
| | | | 73/660 |
| 2014/0030092 A1 | 1/2014 | Heinig et al. | |
| 2014/0100798 A1* | 4/2014 | Guan | G01M 5/0041 |
| | | | 702/42 |
| 2015/0000404 A1* | 1/2015 | Brenner | F03D 17/00 |
| | | | 73/579 |
| 2015/0073627 A1* | 3/2015 | Fang | B64C 27/008 |
| | | | 701/3 |
| 2015/0354402 A1* | 12/2015 | Ehsani | F03D 17/00 |
| | | | 290/44 |
| 2018/0327112 A1* | 11/2018 | Huth | G01L 1/2262 |

FOREIGN PATENT DOCUMENTS

| | | |
|---|---|---|
| EP | 1514121 A1 | 3/2005 |
| WO | 2009047121 A2 | 4/2009 |
| WO | 2012125842 A2 | 9/2012 |

\* cited by examiner

BLADE STRUCTURE HEALTH MONITORING SYSTEM

FOREIGN PRIORITY

This application claims priority to European Patent Application No. 16305499.2 filed Apr. 29, 2016, the entire contents of which is incorporated herein by reference.

TECHNICAL FIELD

The present disclosure is concerned with monitoring the structure of blades, for example, but not exclusively, blades of a propeller such as in an aircraft.

BACKGROUND

Blades in rotating systems such as aircraft propellers are generally made of composite materials. Such propellers are often operating in harsh environments and rotating at high speeds and the blade structure can degrade due to, for example, aging, abnormal loading, shocks, inappropriate maintenance, etc. Composite materials used in such blades are damage tolerant and it has been demonstrated that some significant amount of blade structure degradation is acceptable without impeding safety of propeller operation.

Periodic, non-destructive inspections of the blade structure are usually performed to monitor the condition of the blade structure.

Methods that have been used for such non-destructive examination include visual inspection, ultrasonic phased-array inspection and acoustic thermography inspection. Conventional use of these non-destructive inspection techniques require the rotor to be stationary during the inspection and can be time-consuming. Furthermore, particularly with visual inspection, human error can become a factor.

There is a need to improve the monitoring of the health of blades in a more effective, efficient and reliable manner, preferably while the blades are rotating.

Microelectronic systems have been developed to implement vibration sensors with recording capabilities on or embedded in the blades in order to detect shocks or abnormal events on the blades. Such systems are described in EP 1509775 and EP 1514121.

It would be desirable to use blade sensors to reliably detect blade degeneration, generally. Propellers producing thrust or pressure in a flow field are generally subject to sinusoidal variation of thrust and drag loads on the propeller blades—in other words the inflow angle of the flow field relative to the centreline of the propeller rotation generates a one per revolution (1P) sinusoidal loading of the blades that results in a cycling bending of the blade. This angular inflow—i.e. an inflow that is non-parallel to the propeller shaft—is common particularly when an aircraft is in a yaw or G-producing manoeuvre such as a turn or a climb at take-off, but also in other situations such as during cruise.

The 1P load manifests itself as a moment on the propeller shaft with the advancing blade side thus seeing a higher angle of attack and the receding blade seeing a lower angle of attack.

This flow field excitation also includes harmonics—i.e. 2P, 3P, etc. harmonics. The natural frequencies of the blades are usually set to be far enough removed from the excitations to control the amount of magnification of the deflection caused by structure resonance. As blade structure degrades, there is typically a shift of its natural frequencies that results, if large enough, in a significant difference in blade response to flow field excitation frequencies. Also, as blade structure degrades, the blade becomes less stiff and, thus, for the same loading, deflects more.

SUMMARY

The present disclosure seeks to provide an improved system of monitoring blade health making use of this blade response to flow field excitation frequencies.

The disclosure involves implementing, in each blade of the propeller, sensors such as acceleration, speed or displacement sensors that enable recording the amplitude of the deflection of the respective blade under the 1P, 2P etc. excitations.

According to one aspect, there is provided a rotating system comprising two or more blades mounted in a hub installed on a rotatable propeller shaft, each blade provided with a respective sensor arranged to detect response of the respective blade to harmonic excitation and the system further comprising means configured to compare the response of the respective blade to that of the other blade(s).

The sensors can be any sensors capable of detecting a response or deflection to harmonic excitations, for example an accelerometer, speed sensor or displacement sensor.

The responses of each blade can be compared with the responses of other blades either in a centralised unit such as an aircraft engine controller, or in electronic controls for the propeller or in some other related systems such as a propeller de-icing system control unit or the like, or in a separate, dedicated electronic unit. Alternatively, the monitoring and comparison of the individual responses of the blades can be distributed, i.e. performed at each blade.

In a preferred arrangement, the response of each blade can be compared with an average response from all blades, this may be, for example, determined using a sliding average algorithm to isolate the average response from the 1P or NP harmonic content. The load on each blade varies cyclically along a turn so it is best to do the sliding average computation for one complete revolution or multiple complete revolutions.

Following initial propeller installation or after a blade replacement, each blade response can be recorded and mapped as compared to other blades responses. This initial mapping can later be used when assessing change of individual blade response to take some of the errors and scatters out of the computation.

During operation, actual responses can then be compared to responses of other blades.

In some examples, if the comparison identifies response change exceeding a predetermined threshold, a maintenance message identifying the blade causing the alarm can be sent to the aircraft central maintenance system, or the like, for example via communication buses or wirelessly.

The same system can be used to detect if the propeller operates out of its operating envelope, i.e. to detect overspeed, overtorque, striking of the blades by foreign objects, etc., and, again, appropriate messages can be transmitted to the aircraft central maintenance system.

The sensor outputs can also be used to log operational data for each blade such as, e.g., number of flights, number of flight hours, date of manufacture, maintenance data, date of installation, etc.

The system can also be used to compute and accumulate individual blade fatigue life usage, based on the detected deflections for evaluation of cyclic loading and based on model prediction using propeller driving torque and blade angle data for evaluation of steady loading. Time of operation under each loading condition is used in the computation as well. A rainflow method can be used for example to cumulate different operating conditions and compute cumulated fatigue damage.

The present system allows real-time monitoring of the health of individual propeller blades and allows blade condition to be logged and appropriate maintenance messages to be communicated.

The disclosure also provides a method of monitoring deflection of a blade in a rotating system comprising two or more blades mounted on a rotatable blade shaft; the method comprising detecting response of the blade to harmonic excitation, and comparing the response of the blade to that of other blades.

Preferred embodiments will now be described by way of example only, with reference to the drawings.

DETAILED DESCRIPTION

Figure 1:
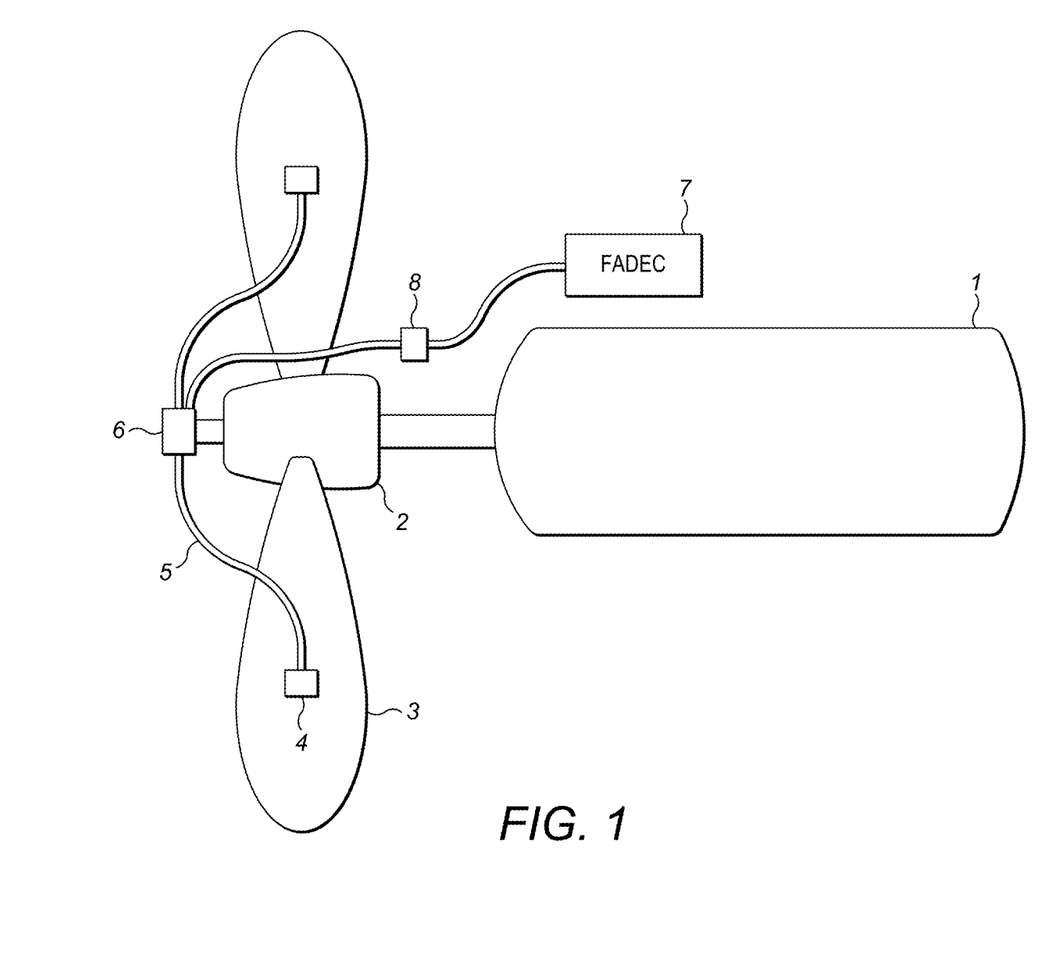
FIG. 1 shows a side view of a propeller system with sensors provided for each blade.

Referring to FIG. 1, a propeller comprises a propeller shaft 1 that rotates a hub 2 on which propeller blades 3 are mounted.

In the embodiment shown in FIG. 1, sensors 4 ($4_1$, $4_2$ . . . $4_N$ for N blades as shown in FIG. 2) are mounted on or embedded in each blade 3 and are connected, e.g. by wiring 5, to a blade prognostic health monitoring (BPHM) control unit 6 arranged, in this case, on the hub.

The BPHM control unit 6 is connected to an FADEC (full authority digital engine control) 7 via a brush block slip ring assembly 8. The FADEC can, instead, be an aircraft maintenance computer AMC.

Figure 2:
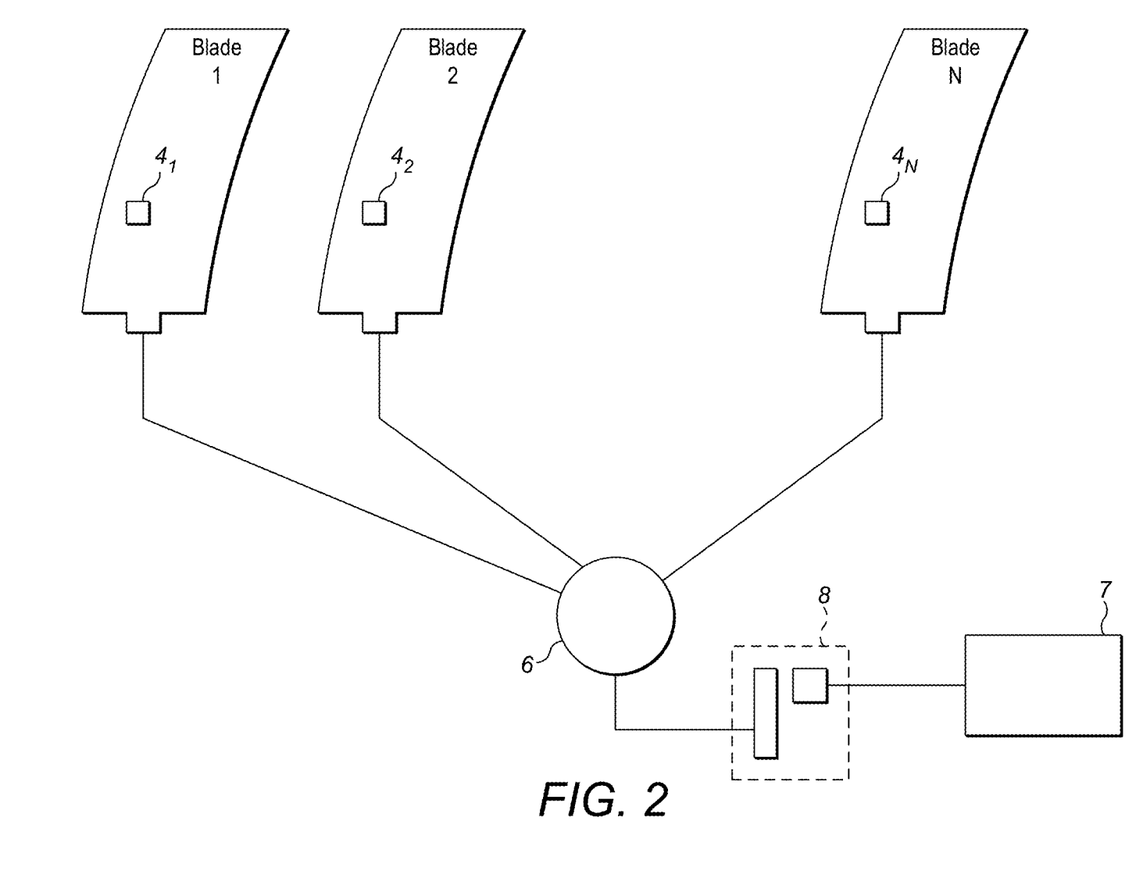
FIG. 2 is a schematic view of the system shown in FIG. 1.

This arrangement is shown in block-diagram form in FIG. 2. In this arrangement, the detection and comparison computations are formed centrally in the BPHM control unit and fault messages are transmitted to the FADEC or AMC.

Figure 3:
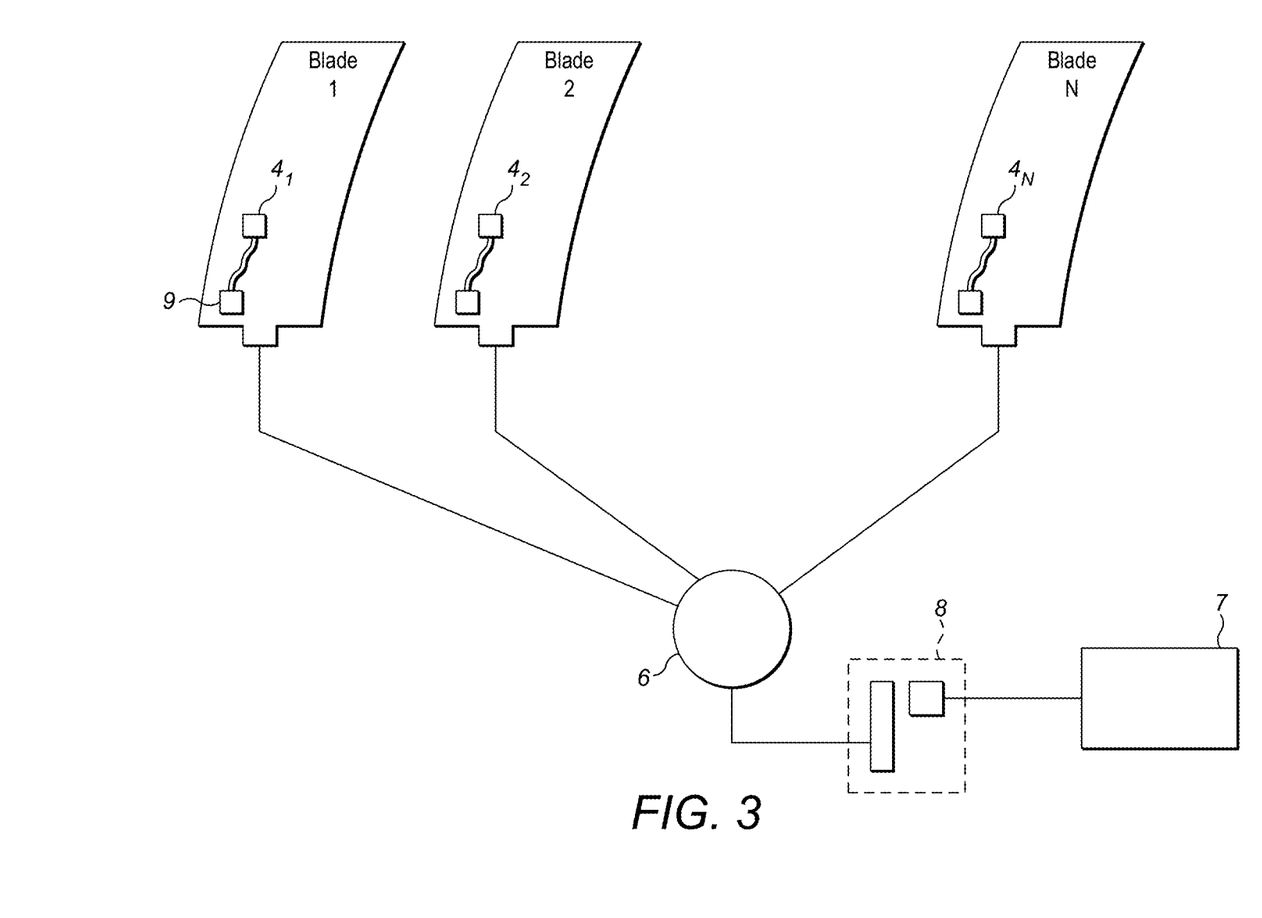
FIG. 3 is a schematic view of an alternative embodiment.

In the embodiment shown in FIG. 3, each blade is provided with, in addition to a sensor, an embedded blade computing unit EBCU 9 to allow for a decentralised monitoring of the individual blade conditions, but the comparisons are formed centrally in the BPHM.

Figure 4:
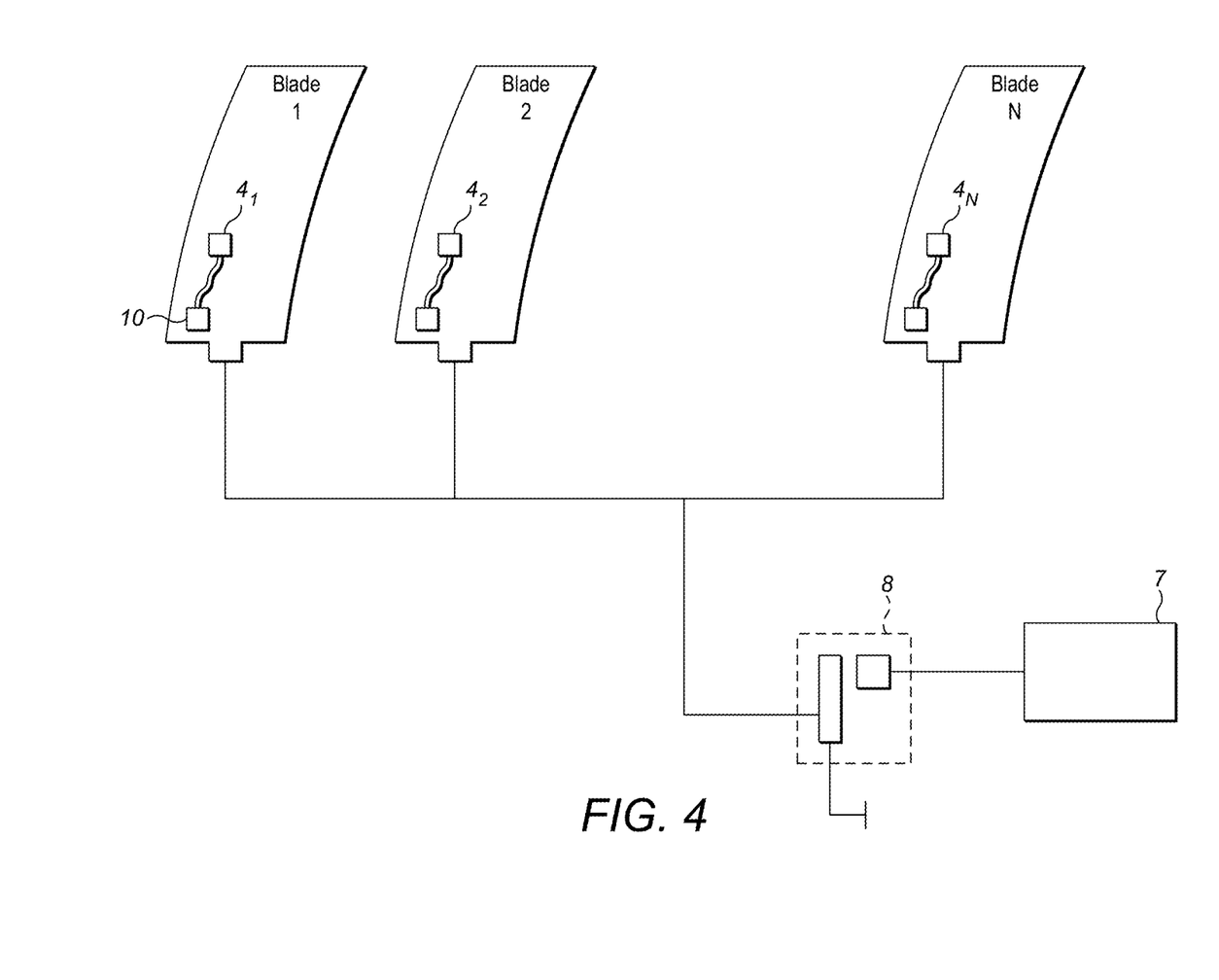
FIG. 4 is a schematic view of a further embodiment.

In another embodiment shown in FIG. 4, each blade is provided with an embedded blade health monitoring computing unit 10 instead of a central BPHM computing unit and these units communicate with the FADEC or AMC via a communication bus, particularly a digital communication bus.

In the embodiments of FIGS. 2 and 3, communication between the EBCUs and BPHM computing units and between the FADEC/AMC and the BPHM can be by means of an analogue or a digital communication bus.

The health of the individual blades is, as mentioned above, determined based on a comparison of blade responses to harmonics. Different algorithms can be used to perform this comparison.

Figure 5:
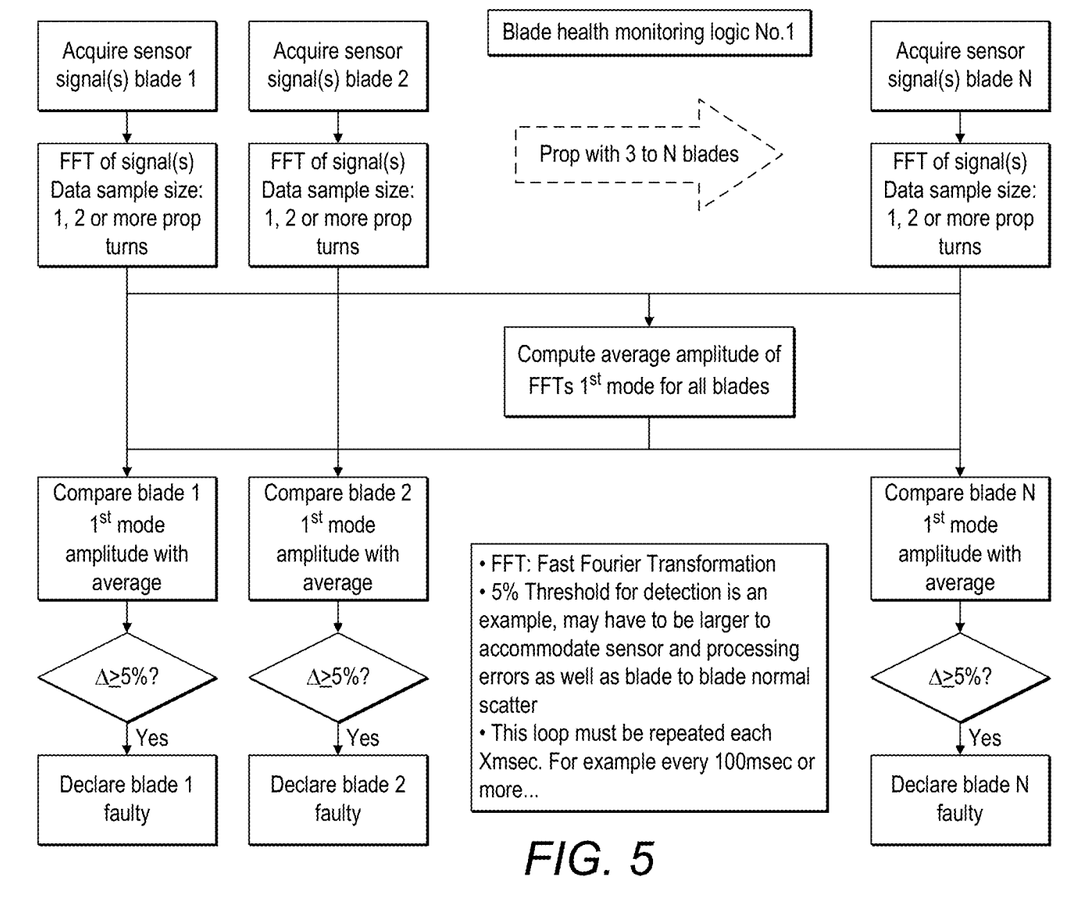
FIG. 5 is a flow chart showing the methodology of one embodiment.

FIG. 5 is a flow chart showing one example algorithm.

For each blade (up to N blades), the sensor signal is acquired and a fast Fourier transform (FFT) is performed on the signals to produce data for one, two or more propeller turns.

The average amplitude of the FFT first mode for all blades is then computed. FFT amplitudes of subsequent modes can also be used if necessary Whilst FFT computing is preferred, the average signals can also be derived without performing FFT.

Then, for each blade, the first mode amplitude response is compared with the computed average amplitude.

If the difference exceeds a predetermined threshold (in this example 5%), that blade is declared as faulty.

The predetermined threshold of 5% is an example only and this may, for example, need to be larger to accommodate a sensor and processing errors as well as blade-to-blade scatter. The threshold can also be less than 5%.

To ensure continuous monitoring of the blade health, the loop is repeated at determined intervals, for example each 100 ms . . . . Other intervals can be used, including intervals much longer than 100 ms.

Figure 6:
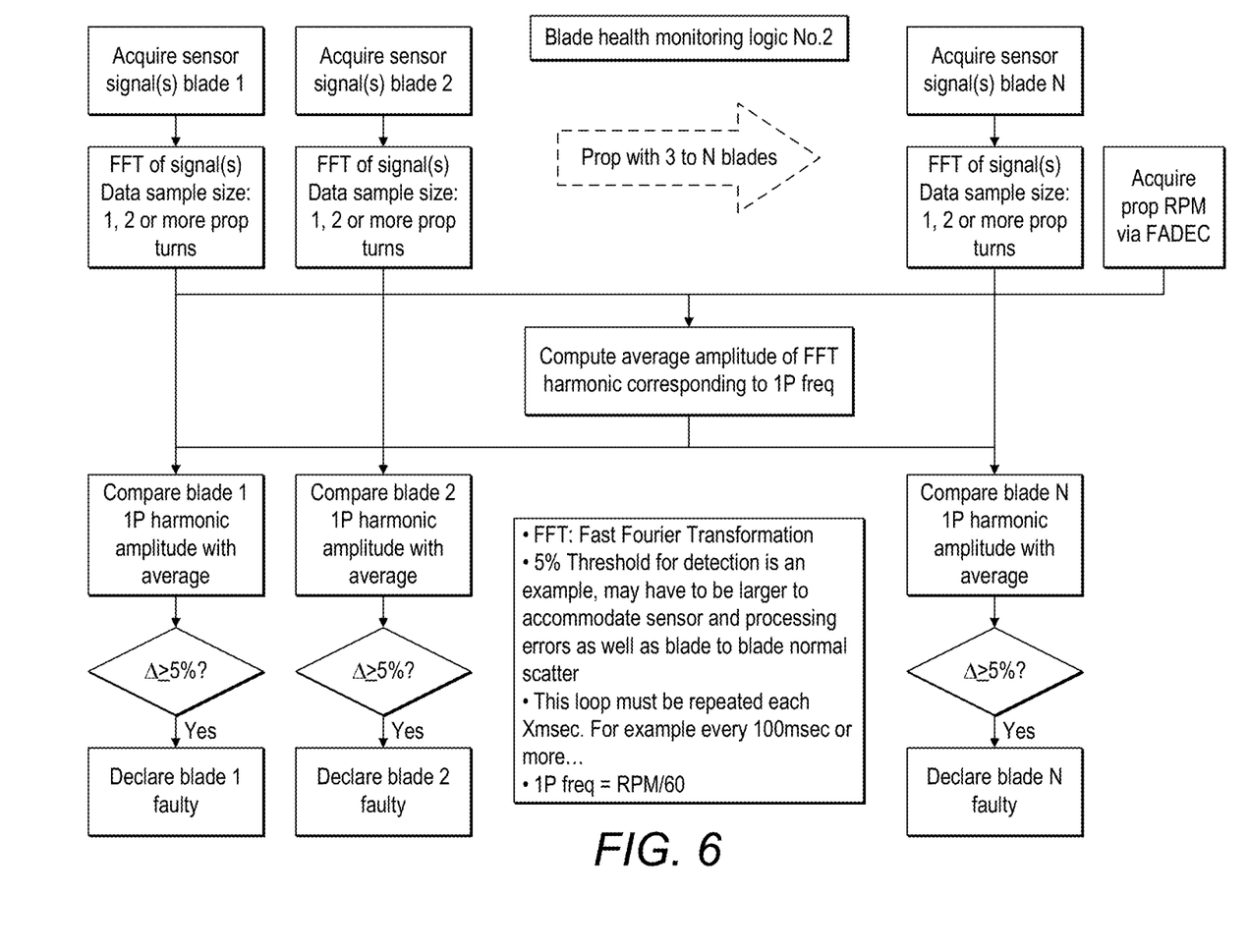
FIG. 6 is a flow chart showing a second embodiment.

In an alternative algorithm, shown in FIG. 6, the rate of rotation of the propeller (the propeller RPM) is acquired from the FADEC.

As with the example shown in FIG. 5, the average amplitude of the FFTs for all of the blades is computed but, in this example, the computation is of the average amplitude of the FFT harmonic corresponding to a frequency of 1P. This is determined from the acquired propeller RPM. 1P frequency is RPM/60.

Then, for each blade, the 1 P harmonic amplitude is compared with the determined average. Again, if the difference exceeds a predetermined threshold, for example 5%, that blade is declared to be faulty. An advantage of this alternative algorithm is to provide a 'filtering' of the sensor signals that can eliminate noise and make the detection more accurate and robust.

Figure 7:
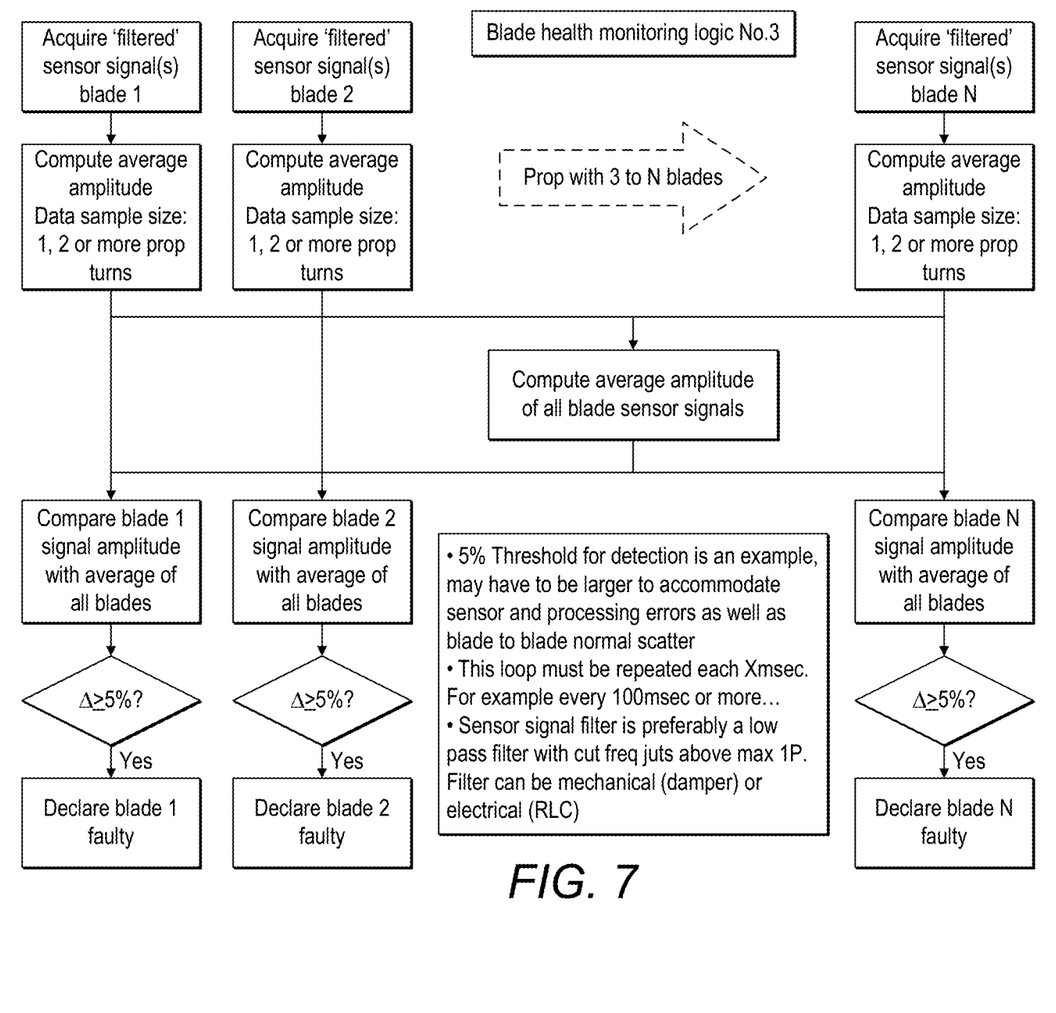
FIG. 7 is a flow chart showing an alternative embodiment.

In an alternative embodiment shown in FIG. 7, the sensor signals for each blade are filtered and, at each blade, e.g. in an EBCU as shown in FIG. 3, an average amplitude for that blade is computed.

An average amplitude for all of the blade sensor signals is then computed and the average amplitude determined for each blade is compared with the common blade average. Again, this is then compared with a predetermined threshold, e.g. 5%, and if the comparison exceeds the threshold, the blade is declared to be faulty.

Figure 8:
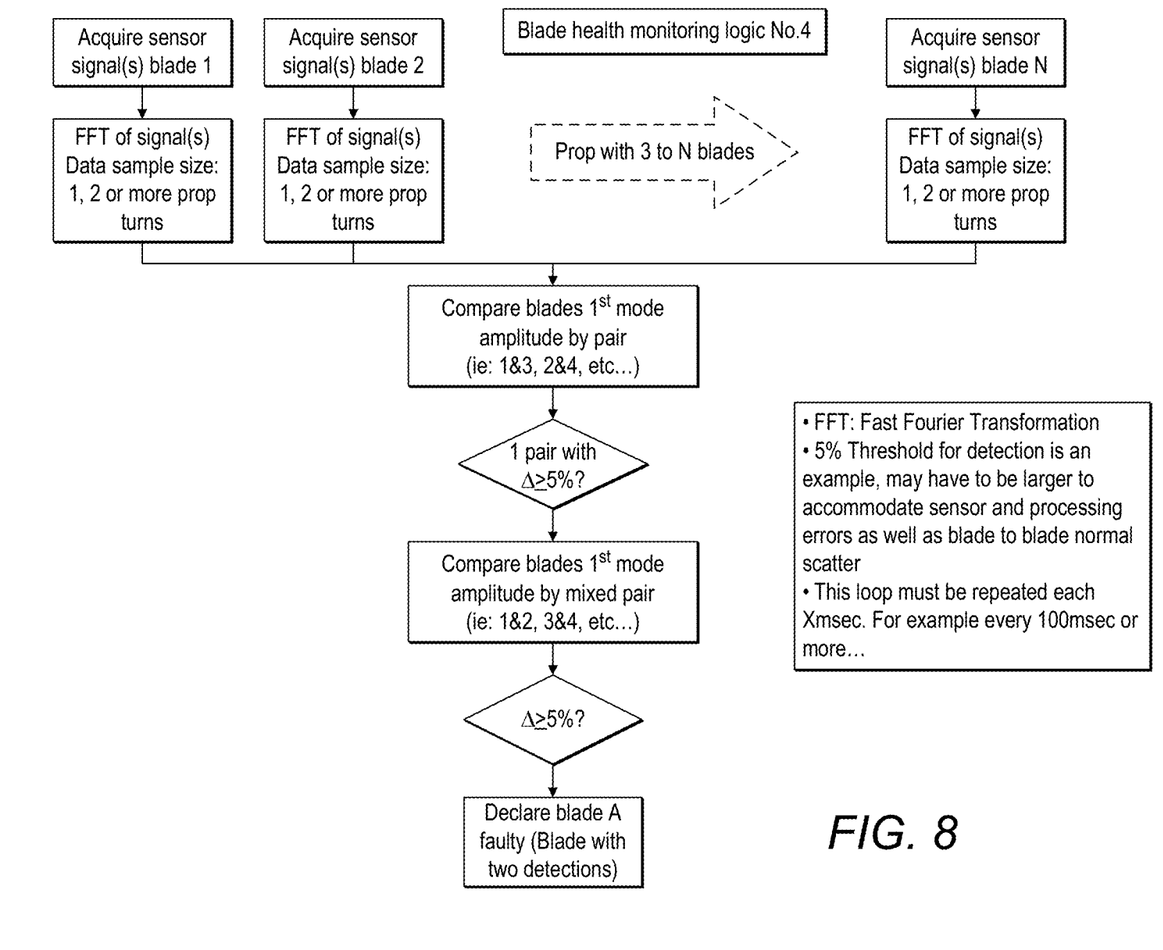
FIG. 8 is a flow chart showing another embodiment.

In the algorithm shown in FIG. 8, the sensor signals are acquired for each blade and the FFTs are determined for each blade as in the other examples. Then, essentially, the first mode amplitudes of the blades are compared pair-by-pair, for example the first mode amplitudes of the first and third blades are compared, the second and fourth blades, etc. If this comparison yields a difference exceeding a predetermined threshold, e.g. 5%, a comparison is then performed using different combinations of pairs of blades, e.g. blades 1 and 2, 3 and 4, etc. and the difference is again compared with the predetermined threshold. A blade with two detections exceeding the threshold is declared faulty.

Figure 9:
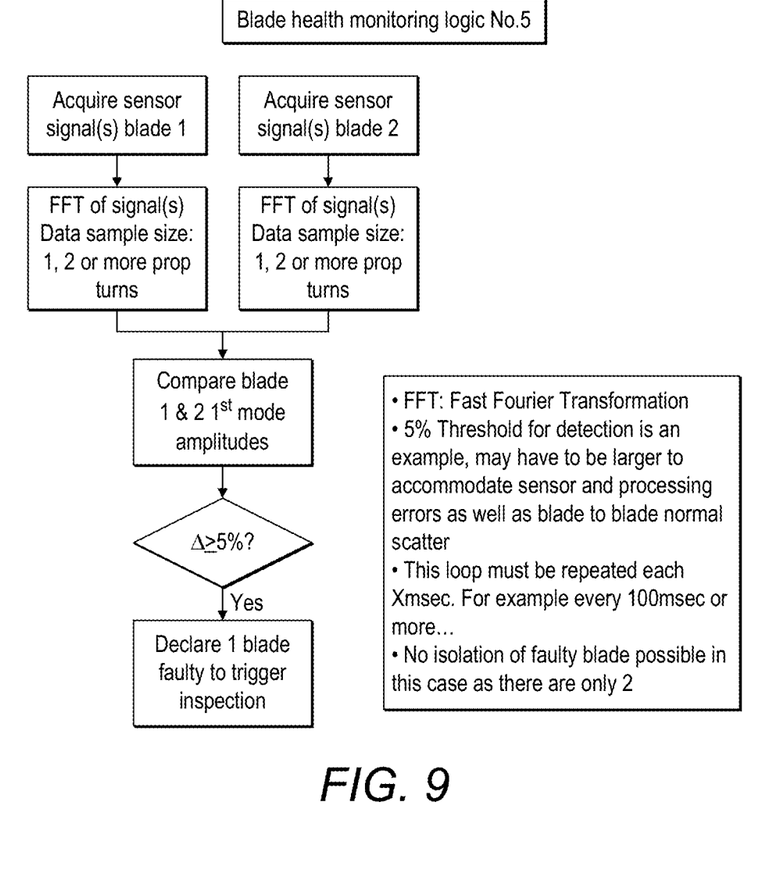
FIG. 9 is a flow chart showing another embodiment.

FIG. 9 shows an algorithm of an example having only two blades.

Here, the FFTs for each blade are compared with each other for the first mode amplitudes and if the difference is greater than or equal to the predetermined threshold, e.g. 5%, then one of the blades is considered to be faulty and this triggers an inspection to determine which blade is faulty. Where only two blades are compared, in this algorithm, as there are only two blades to compare, it is not possible, in the algorithm, to isolate the faulty blade and this must be done by inspection.

In the examples shown, the method is performed during operation of the rotating system/propeller i.e. whilst the blades are rotating during flight of an aircraft incorporating the propeller.

The invention claimed is:

1. A method of monitoring deflection of a blade in a rotating system comprising two or more blades mounted on a rotatable blade shaft, the two or more blades subjected to a one per revolution, 1P, sinusoidal excitation, generated by an inflow angle of a flow field relative to a center line of rotation of the system; the method comprising:

detecting response of the two or more blades to the forced one per revolution, 1P, sinusoidal excitation via signals output from two or more sensors, each sensor of the two or more sensors disposed at a blade of the two or more blades;

performing a fast Fourier transform (FFT) on the signals output from the two or more sensors for at least one full revolution of the rotating system;

computing an average amplitude for the two or more blades of the FFT harmonic corresponding to a frequency of 1P;

comparing, for each blade of the two or more blades, a 1P harmonic amplitude of the blade with the average amplitude for the two or more blades;

determining, for each blade of the two or more blades, a difference between the 1P harmonic amplitude of the blade and the average amplitude for the two or more blades; and determining, for each blade of the two or more blades, that the blade is faulty if the difference exceeds a predetermined threshold.

2. The method of claim 1, further comprising issuing a notification if the difference exceeds the predetermined threshold.

3. The method of claim 1, wherein the detecting is performed whilst the blades are rotating during operation of the rotating system.

* * * * *